Feb. 10, 1953  J. CHAVES  2,627,989
LOADING MECHANISM FOR TRACTORS
Filed Sept. 29, 1948  3 Sheets-Sheet 1
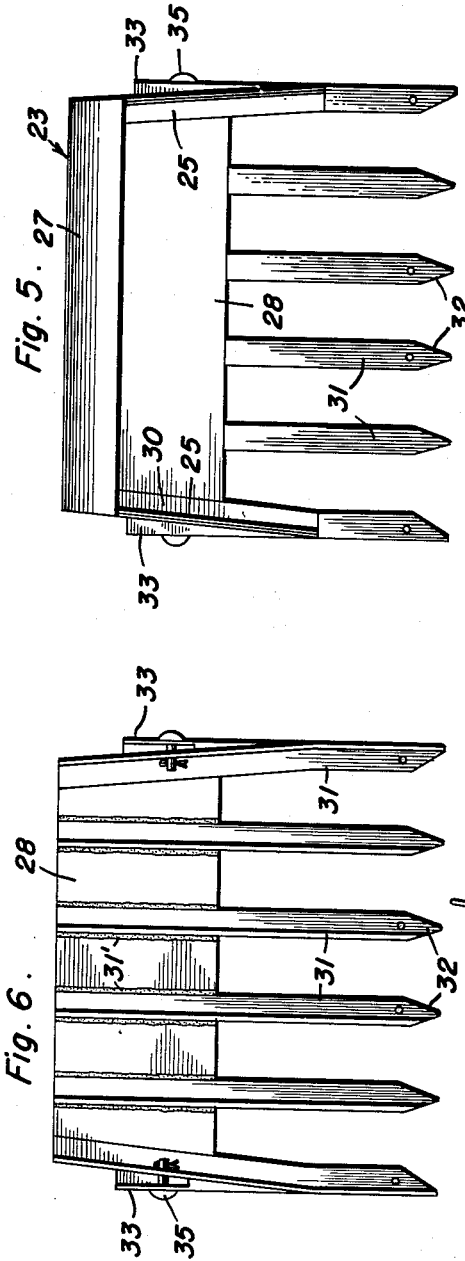
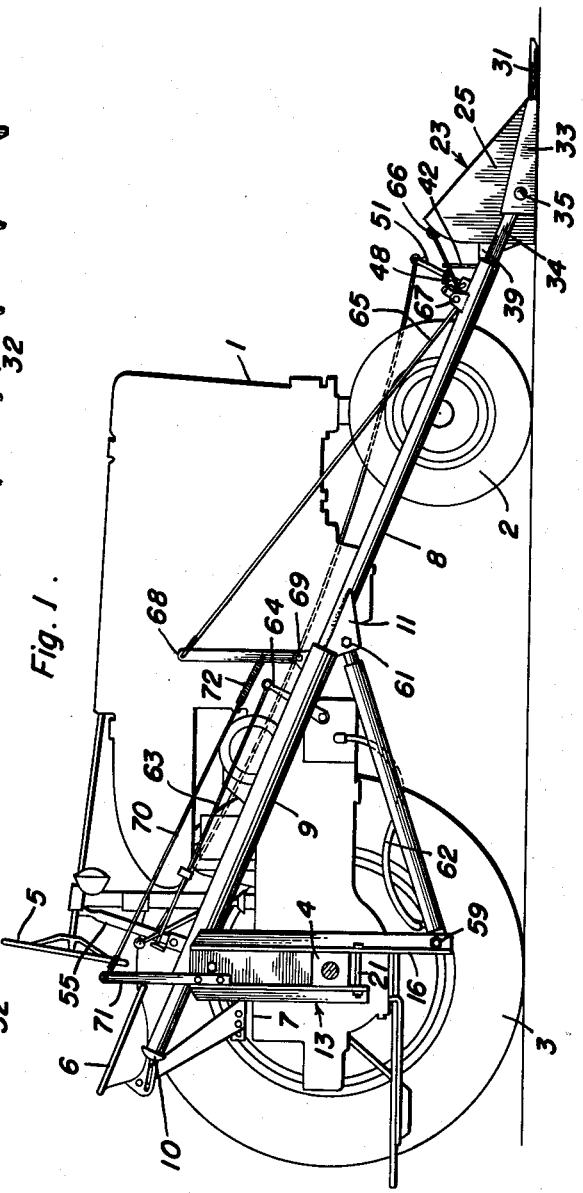
Joseph Chaves
INVENTOR.
BY *Clarence A. O'Brien
and Harvey B. Jacobson*
Attorneys Feb. 10, 1953     J. CHAVES     2,627,989
LOADING MECHANISM FOR TRACTORS
Filed Sept. 29, 1948     3 Sheets-Sheet 2
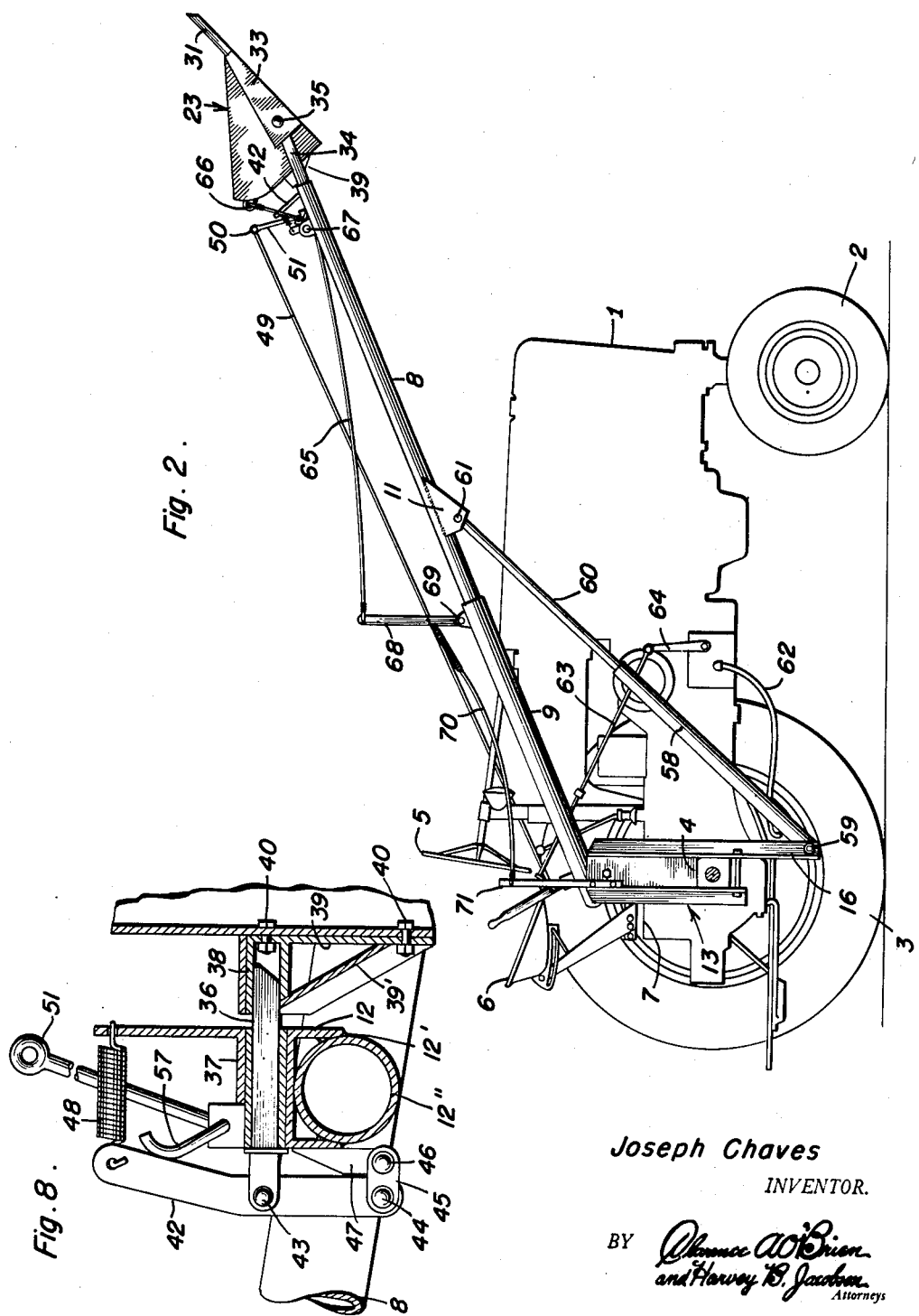
Joseph Chaves
INVENTOR.

Feb. 10, 1953  J. CHAVES  2,627,989
LOADING MECHANISM FOR TRACTORS
Filed Sept. 29, 1948  3 Sheets-Sheet 3
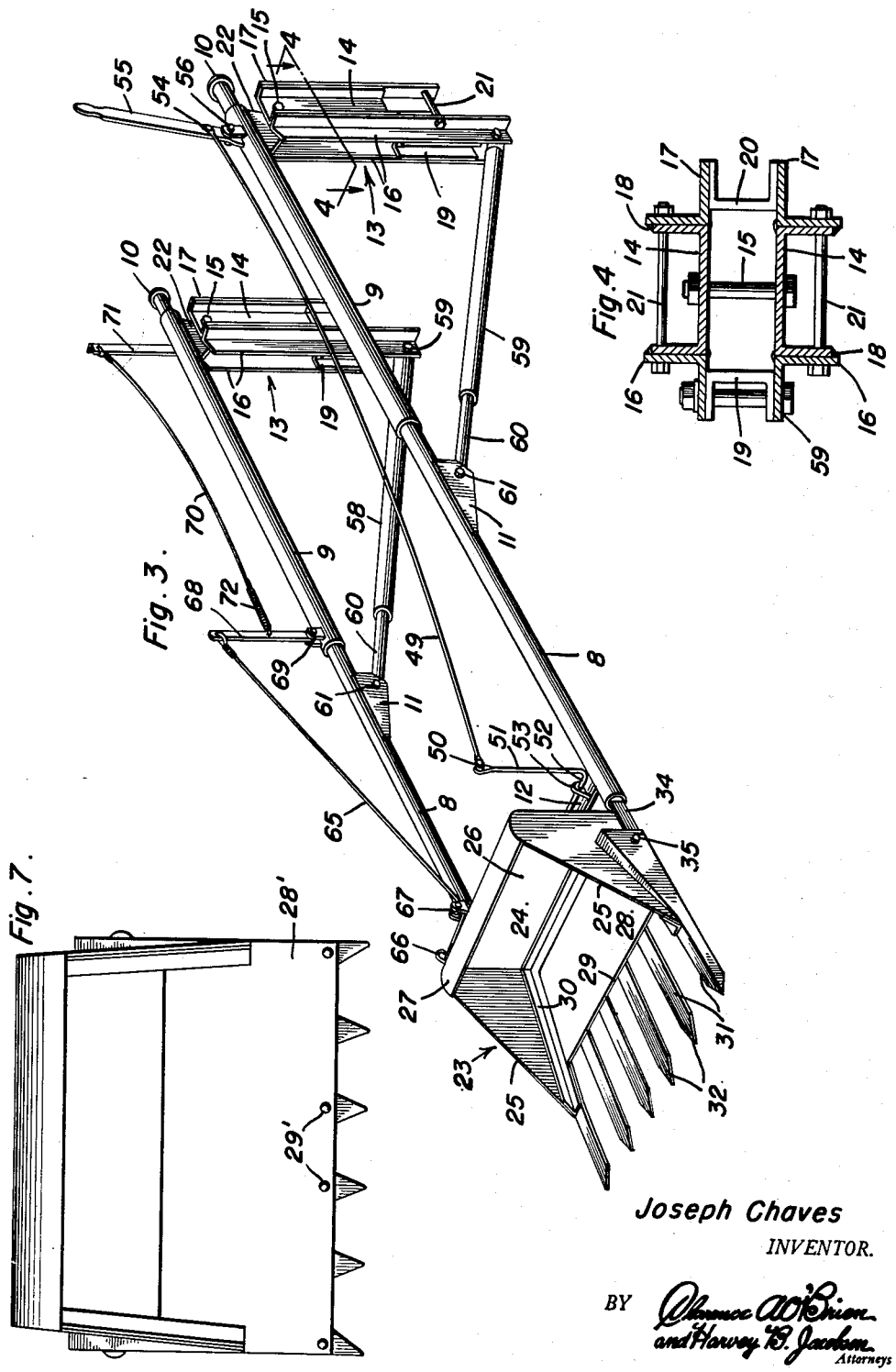
Joseph Chaves
INVENTOR.

Patented Feb. 10, 1953

2,627,989

UNITED STATES PATENT OFFICE 2,627,989

LOADING MECHANISM FOR TRACTORS

Joseph Chaves, Newport, R. I.

Application September 29, 1948, Serial No. 51,705

3 Claims. (Cl. 214—140)

My invention relates to improvements in loading mechanisms for use on tractors.

By way of explanation: with present day loading mechanisms of tractors in which a scoop or a fork is loaded by being pushed into the material by the tractor, it frequently becomes impossible to adequately load the scoop or fork because, before the scoop or fork becomes loaded, the resistance opposed to travel of the tractor causes the traction wheels of the tractor to spin and lose traction or stall.

Having the foregoing in mind, it is the primary object of my invention to provide in such mechanisms for adequately loading a scoop or a fork by power propulsion of the same independently of travel of the tractor so that the scoop may be loaded regardless of loss of traction or stalling by the tractor in forward travel thereof.

Another object is to provide a mechanism of the character and for the purposes above indicated which is adapted for attachment to standard tractors and for hydraulic operation both in lifting a loaded scoop or fork and propelling the same independently of the tractor.

Still another object is to provide mechanism for the purpose above set forth which is simple in construction, easy to install on standard tractors, and comparatively inexpensive to manufacture and operate.

Other and subordinate objects, also comprehended by my invention, together with the precise nature of my improvements will be readily understood when the succeeding description and claims are read with reference to the drawings accompanying and forming part of this specification.

In said drawings:

Figure 1 is a view in side elevation, partly in section, illustrating my improved loading mechanism attached to a tractor with the parts positioned for loading;

Figure 2 is a similar view with the parts positioned for unloading;

Figure 3 is a view in perspective of the loading mechanism detached;

Figure 4 is a view in horizontal section taken substantially on the line 4—4 of Figure 3 and drawn to a still larger scale;

Figure 5 is a view in plan of the combination fork and scoop drawn to a larger scale;

Figure 6 is a view in bottom plan of the same;

Figure 7 is a view in plan of the combination fork and scoop with the bottom extension plate in place;

Figure 8 is a view partly in vertical section and partly in side elevation of the latching means for the combination fork and scoop drawn to a larger scale.

Referring to the drawings by numerals, my improved loading mechanism has been shown therein, for the purpose of illustration, as forming an attachment for a usual type of tractor 1 having front wheels 2, rear traction wheels 3, a rear axle housing 4, a steering wheel 5, a driver's seat 6, and a rear platform 7.

The loading apparatus of my invention comprises, as its basic components, a pair of tubular carrying arms 8 for a combination fork and scoop, presently described, which are disposed upon opposite sides of the tractor 1 to extend forwardly of said tractor, and endwise slidable forwardly and rearwardly in a pair of relatively shorter, tubular guides 9 also disposed upon opposite sides of the tractor 1, both the scoop carrying arms 8 and the tubular guides 9 extending parallel with the sides of said tractor. Rear end heads 10 on said arms 8 are provided to abut the rear ends of said guides 9 and thereby limit the forward sliding of said arms 8. Depending ears 11 one on each of said arms 8, in advance of the tubular guide 9 therefor, limit rearward sliding of said arms 8, and also serve another purpose presently clear. A channel bar 12 is welded as at 12' on a tubular cross member 12", adjacent the front ends of said arms 8 and, together with said member 12", ties the same together for swinging movement in unison as will presently appear.

The tubular guides 9 are mounted at the rear ends thereof for vertical swinging movement to permit corresponding movement of the scoop carrying arms 8. For this purpose, a pair of guide supporting brackets 13 are provided on the rear axle housing 4 at opposite sides of the tractor 1. The guide supporting brackets 13 each comprise a pair of spaced apart channel iron cheek plates 14 adapted to rest upon the rear axle housing 4 in upstanding position with a cross bolt 15 connecting the same above said housing, front and rear pairs of angle iron legs 16, 17 welded, as at 18, to the sides of said plates 14 and straddling said housing 4, front and rear channel iron spacing bars 19, 20 spacing the legs 16, 17 apart in each pair, and bolts 21 extending through the front and rear legs 16, 17 upon opposite sides of the bracket and below said housing 4, said bolts 21 clamping said legs against said housing to secure the bracket in place. Rear end ears 22 on the tubular guides 9 depend therefrom between the pairs of cheek plates 14 with the cross bolts 15 extending horizontally therethrough, so that said guides 9 together with said arms 8 are vertically swingable about an axis transverse to the tractor 1 and above the rear axle housing 4. The front legs 16 of the brackets 13 are longer than the rear legs 17 to depend well below the rear axle housing 4 for a purpose presently seen.

The combination fork and scoop 23 comprises an open-front scoop forming section 24 with triangular sides 25, a back 26 with a forwardly rolled top edge 27, and preferably formed integrally with the sides 25, a bottom 28 presenting a straight front cutting edge 29, and a bottom iron angle frame bar 30 to which the sides 25, back 26, and bottom 28 are suitably secured as by welding, not shown. A plurality of equidistantly spaced angle bars 31, with front sharpened ends 32, underlie the section 24 and extend forwardly therefrom to form fork tines on said section, said angle bars 31 being suitably secured to the bottom 28 as by welding 31'. As will be seen, the scoop forming section 24 and the angle bars 31 form a combination fork and scoop structure particularly adapted for use as a fork for picking up manure and the like, or for use as a scoop in picking up dirt and similar material. An extension bottom plate 28' is provided for the combination fork and scoop 23 for bolting as at 29' to the angle bars 32 to enlarge the capacity of said section. The sides 25 of said section 24 converge relatively, rearwardly, and are provided with outer side boxings 33 in which flat front ends 34 of said carrying arms 8 extend in straddling relation to said section 24 and are pivoted by pins 35 so that the combination fork and scoop 23 is swingable about a horizontal axis, transverse to the tractor 1, for a purpose presently apparent. The ends 34 are those of reinforcing bars socketed in the front ends of said rods 8 suitably secured therein.

Latch means is provided for holding the combination fork and scoop 23 against swinging about its horizontal axis of swinging movement comprising a latch bolt 36 slidable forwardly in a guide bracket 37 on the cross member 12 to project the same into a socket 38 on a bracket plate 39 bolted, as at 40, to the back 27 of the scoop forming section 24. An upstanding latch bolt operating lever 42, on which the latch bolt 36 is pivoted, as at 43, is pivoted, in turn, at its lower end, as at 44, to a compensating link 45 pivoted, as at 46, on a lug 47 on the cross member 12, said lever 42 being tensioned by a suitably connected spring 48 for forward swinging to project the latch bolt 36 into the socket 38. The described parts of the latch means one located midway between the carrying arms 8. A pull cable 49 is suitably connected at its front end, as at 50, to the upper end of an upstanding latch tripping lever 51 on one end of a rock shaft 52 extending along the member 12 and journalled in ears 53 on said member 12, the rear end of said pull cable 49 being suitably fixed, as at 54, to a cable pulling hand lever 55 pivoted, as at 56, on one guide 9 adjacent the driver's seat 6. The tripping lever 51, pull cable 49 and hand lever 55 are all on one side of the tractor 1, as shown. A crank arm 57 on the rock shaft 52 is provided for operating the latch bolt operating lever 42 when pull is exerted on the tripping lever by the pull cable 49. By operating the hand lever 55 to pull on the cable 49, the latch bolt operating lever 42 will be swung in opposition to the spring 48, to retract the latch bolt 36 out of the socket 38 and unlatch the combination fork and scoop 23. The pivot pins 35 of said combination fork and scoop 23 are so arranged that when said scoop 23 is unlatched, the same will swing downwardly and forwardly, under the influence of gravity, to dump a load therein. The bracket plate 39 is provided with an inclined guide 39' for retracting the latch bolt 36 during swinging of the combination fork and scoop 23 back into normal working position, said guide holding said bolt retracted until said scoop is back into working position and then releasing said bolt for snapping under the urge of the spring 48 into the socket 38.

Hydraulic means is provided for swinging the carrying arms 8 upwardly comprising the following. A pair of tubular cylinders 58 are provided upon opposite sides of the tractor 1, below the tubular guides 9, and which extend forwardly from the brackets 13 with rear ends pivoted, by pins 59, between the front pairs of legs 16 below the rear axle housing 4, so that said cylinders are vertically swingable and coplanar with said guides 9. A pair of rod like pistons 60 extend out of the front ends of said cylinders 58 with front ends pivoted by pins 61 to the ears 11 of said carrying arms 8, so that said pistons 60 swing with said cylinders 58 in connection with said arms 8. Suitable hydraulic lines one of which is shown at 62 extend from the rear ends of the cylinders 58 into one side of the tractor 1 to a suitable hydraulic pump, not shown, with which tractors of the type shown are provided. The hydraulic lines 62 are both pressure and release lines under control of a rod 63 and a crank 64 forming part of the tractor equipment for controlling the pump in a manner well understood in the art.

Referring now to the operation of the described mechanism. With the rod 63 operated to cause release of pressure in the hydraulic lines 62, the carrying arms 8 for the combination fork and scoop 23 together with the tubular guides 9, cylinders 58 and pistons 60, swing downwardly, under the influence of gravity, to lower the combination fork and scoop 23 into loading position while latched, or being latched in the manner described in the foregoing against swinging about its horizontal axis of movement. As best shown in Figure 1, when the parts are in such down swung position, said scoop 23 is arranged for loading by forward travel of the tractor 1 and in substantially horizontal position. As the combination fork and scoop 23 is pushed forwardly by the tractor, said arms 8 will be slid rearwardly in the tubular guides 9 until the ears 11 engage the front ends of said guides, the pistons 60 sliding rearwardly in the cylinders 58. Thus, the carrying arms 8 and said scoop 23 are adjusted rearwardly of the tractor 1 for independent movement forwardly thereof. Now, if the combination fork and scoop 23 cannot be filled by pushing the same forwardly, without the traction wheels 3 of the tractor 1 skidding, the tractor 1 may be stopped and preferably chocked, or braked, to hold the same against rearward movement and/or spinning of the rear traction wheels 3. The rod 63 may now be operated to cause the hydraulic pressure lines 62 to direct fluid under pressure into the rear ends of the cylinders 58, so as to move the pistons 60 forwardly. The first result of such movement of the pistons 60, with the combination fork and scoop 23 held down by the load therein and the weight of the parts, will be to slide the carrying arms 8 forwardly into the described forward limit of sliding thereof, thus pushing the combination fork and scoop 23 forwardly of the tractor 1 to complete the load therein. The second result of such forward sliding of the carrying arms 8 is that said arms 8 with the tubular guides 9 will be swung upwardly as shown in Figure 2, to elevate the combination fork and scoop 23 which may then be caused to dump by unlatching the same in the manner already described.

Means are provided for swinging the combination fork and scoop 23 back into normal working position from dumping position during lowering of the same comprising the following. On the side of the tractor 1 opposite the pull line 49 a pull line 65 is attached at its front end, as at 66, to one rear corner of said scoop 23, above the pivot pins 35, and extended downwardly and rearwardly from said scoop under a pulley block 67 on the adjacent carrying arm 8. From the pulley 67 said line is extended rearwardly to the upper end of an upstanding lever 68 having its lower end pivoted, as at 69, on the guide 9 of said carrying arm 8 so that said lever is swingable forwardly and rearwardly on said guide 9. A tension line 70 extends rearwardly from an intermediate point on said lever 68 to the upper end of a rigid upright 71 upstanding for the bracket 13 on which said guide 9 is pivoted. A coil spring 72 in the line 70 acts together with said line 70 to pull the lever 68 rearwardly on its pivot 69 when the carrying arms 8 and guides 9 swing downwardly to lower said scoop 23. Thus rearward swinging of the lever 68 pulls on the pull line 65 to swing said scoop 23 on the pivot pins 35 back into normal working position in which it is latched with a snap section in the manner already described. The coil spring 72 compensates for independent forward sliding of said scoop 23 relative to the tractor 1.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claims.

Having described the invention, what is claimed as new is:

1. Loading and dumping mechanism for a tractor comprising a pair of elongated guides extending toward the front of the tractor along opposite sides thereof and pivoted thereon for swinging upwardly and downwardly, a pair of arms carried by said guides for swinging upwardly and downwardly therewith and slidably connected thereto for advance and retraction relative to the tractor, a scoop carried between said arms forwardly of the tractor for raising and lowering by swinging of said arms upwardly and downwardly, respectively, and pivoted to said arms for swinging into dumping and loading positions thereon, a pair of hydraulic cylinders below said guides and arms pivoted to the tractor at opposite sides thereof for swinging upwardly and downwardly and having projecting piston rods pivoted to said arms in advance of the guides and together with said cylinders inclining upwardly and forwardly with respect to said arms when the arms and guides are swung downwardly to thrust upwardly against said arms at an angle thereto in opposition to the load opposing the same and advance said arms and scoop relative to the tractor, co-engaging devices on said guides and arms limiting advance of said arms and scoop relative to the guides so that continuing upward thrust of said piston rods, in the limit of advance of the arms and scoop, will raise said arms to raise said scoop, and tensioned means connected to said tractor and scoop to swing said scoop into loading position when said arms and scoop are lowered and yielding under tension when said arms and scoop are advanced.

2. Loading and dumping mechanism for a tractor comprising a pair of elongated guides extending toward the front of the tractor along opposite sides thereof and pivoted thereon for swinging upwardly and downwardly, a pair of arms carried by said guides for swinging upwardly and downwardly therewith and slidably connected thereto for advance and retraction relative to the tractor, a scoop carried between said arms forwardly of the tractor for raising and lowering by swinging of said arms upwardly and downwardly, respectively, and pivoted to said arms for swinging into dumping and loading positions thereon, a pair of hydraulic cylinders below said guides and arms pivoted to the tractor at opposite sides thereof for swinging upwardly and downwardly and having projecting piston rods pivoted to said arms in advance of the guides and together with said cylinders inclining upwardly and forwardly with respect to said arms when the arms and guides are swung downwardly to thrust upwardly against said arms at an angle thereto in opposition to the load opposing the same and advance said arms and scoop relative to the tractor, co-engaging devices on said guides and arms limiting advance of said arms and scoop relative to the guides so that continuing upward thrust of said piston rods, in the limit of advance of the scoop and arms, will raise said arms, to raise said scoop.

3. The combination of claim 2, said co-engaging devices comprising stops on said arms engaging the guides.

JOSEPH CHAVES.

REFERENCES CITED

The following references are of record in the file of this patent:

UNITED STATES PATENTS

| Number | Name | Date |
| --- | --- | --- |
| 1,441,700 | Middlemiss | Jan. 9, 1923 |
| 2,295,917 | Schwan | Sept. 15, 1942 |
| 2,396,107 | Lessmann | Mar. 5, 1946 |
| 2,454,461 | Knapp | Nov. 23, 1948 |
| 2,456,491 | Collins | Dec. 14, 1948 |
| 2,472,223 | McElhinney et al. | June 7, 1949 |
| 2,475,498 | Haynes | July 5, 1949 |
| 2,479,048 | Machin | Aug. 16, 1949 |
| 2,501,231 | Mefferd | Mar. 21, 1950 |
| 2,503,577 | Borgelt | Apr. 11, 1950 |
| 2,531,993 | Smith | Nov. 28, 1950 |